United States Patent [19]

McMullin

[11] 4,254,549
[45] Mar. 10, 1981

[54] CABLE CUTTER

[75] Inventor: Earl W. McMullin, Hastings, Mich.

[73] Assignee: Hastings Fiber Glass Products, Inc., Hastings, Mich.

[21] Appl. No.: 969,995

[22] Filed: Dec. 15, 1978

[51] Int. Cl.³ .............................................. A01G 3/00
[52] U.S. Cl. .................................................... 30/251
[58] Field of Search ................. 30/249, 250, 251, 243, 30/92, 245, 248

[56] References Cited

U.S. PATENT DOCUMENTS

| 32,827 | 7/1861 | Evans | 30/245 |
|---|---|---|---|
| 2,602,994 | 7/1952 | McGary | 30/251 |
| 2,993,275 | 7/1961 | Kazunosuke | 30/250 |
| 3,138,869 | 6/1964 | Parhaniemi | 30/250 X |

FOREIGN PATENT DOCUMENTS 2035286  2/1971  Fed. Rep. of Germany ............. 30/243

Primary Examiner—Jimmy C. Peters
Attorney, Agent, or Firm—Blanchard, Flynn, Thiel, Boutell & Tanis

[57] ABSTRACT

A manually operable tool for use by electric utility linemen for cutting electric conductors. The tool comprises an elongated pole having a cutter mechanism mounted on one end thereof. A manually operable ratchet mechanism is mounted on the pole close to the other end thereof and is connected to the cutter mechanism by linkage so that the cutting action is effected by operation of the ratchet mechanism.

9 Claims, 6 Drawing Figures

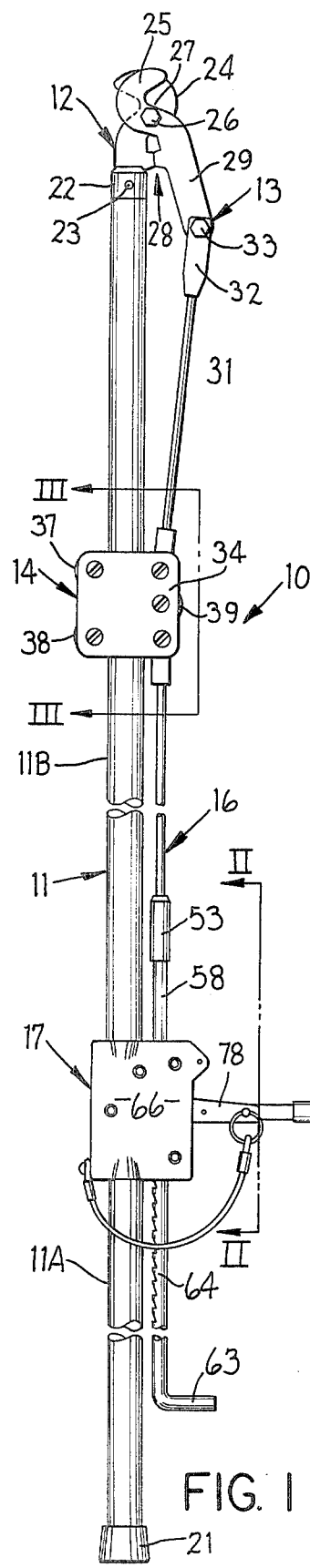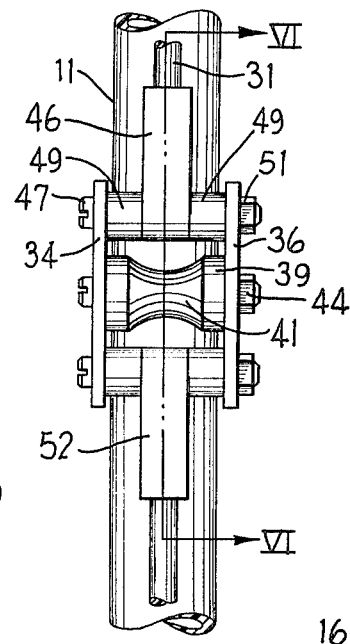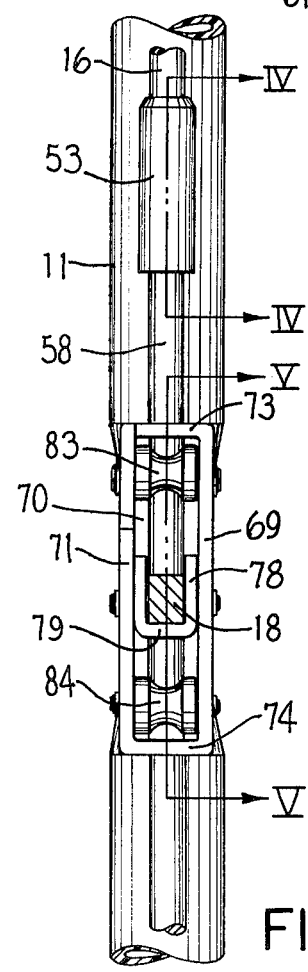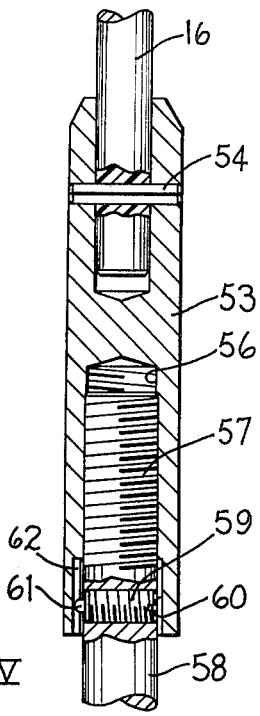

CABLE CUTTER

This invention relates to a manually operable tool for cutting cables. More particularly, the invention relates to a tool, for use by electric utility linemen, for cutting ACSR (aluminum conductor steel reinforced) conductors and soft wire (aluminum or copper wire) stranded conductors.

ACSR conductors comprise a sheath made of several spirally wound aluminum wires wrapped around a core of several spirally wound steel wires. ACSR conductors are used for various purposes, such as high voltage transmission lines, by electric utilities and they can carry very high voltages, such as up to 345 KV. Electric utilities also use so-called "soft wire" cables made of stranded aluminum or copper wire for electric power transmission purposes. The cables can be used both as overhead transmission lines and as underground lines buried in the ground. Such cables can be of quite large diameters, i.e., up to about 2 inches in diameter including the insulation layer. Such cables must be cut during installation and maintenance work, including when the cables are energized.

Tools for use by electric utility linemen should be lightweight so that they can be handled easily. Further, such tools must provide sufficient electrical insulation to protect the linemen during work on or close to energized lines. It is conventional to use electrical insulating handles having the form of elongated hollow poles made of fiberglass bonded with epoxy resin or polyester resin, which poles are effective for electrical insulating purposes. The operative part of the tool is mounted on one end of the pole and the lineman grasps the other end of the pole during manipulation thereof.

In the cutting of large diameter ACSR cables and stranded soft wire cables, it is desired to make clean cuts without leaving burrs and without appreciably flattening the strands of the cable. Because of the relatively large diameters of such cables, it is very difficult to cut them by scissor-like shears operated by purely manual force. There have been commercially used hydraulically operated cutters in which a manually operated pump is mounted on the handle for operation by the lineman and the pressured hydraulic fluid is used to operate a piston in order to actuate the movable cutter blade. Such devices are relatively expensive because of the relatively high cost of the components of the hydraulic circuit. Moreover, they are likely to require relatively frequent maintenance, because of leakage, breakage of hoses and the like.

It is an object of this invention to provide an improved, manually operated, cutting tool capable of cutting satisfactorily relatively large diameter conductors, including ACSR conductors and soft wire conductors, wherein the cutting blades are operated by exclusively mechanical power assist means.

It is a further object of this invention to provide an improved cutting tool, as aforesaid, which is less expensive and more durable than the hydraulically operated cutters previously used for the same purpose.

It is another object of this invention to provide an improved insulated cutting tool, as aforesaid, which can be used by a lineman to cut an energized conductor.

It is an additional object of this invention to provide an improved cutting tool, as aforesaid, which is lightweight, which can easily be handled with safety, and which can be used under closely confined conditions, for example, to cut underground conductors accessible through a narrow trench, as well as to cut conductors mounted on overhead towers or posts.

SUMMARY OF THE INVENTION

According to the invention, there is provided a manually operable cutting tool comprising an elongated pole made of electrical insulating material and having a cutter assembly mounted on the upper end thereof. A manually operable ratchet mechanism is mounted on the pole close to the lower end thereof. Linkage connects the ratchet mechanism to the cutter assembly so that operation of the ratchet mechanism is effective to operate the cutter mechanism.

BRIEF DESCRIPTION OF THE DRAWINGS

The attached drawings illustrate a preferred embodiment of the invention. In the drawings:

FIG. 1 is a side view, partially broken away, of the improved cutting tool according to the invention.

FIG. 2 is a sectional view taken along the line II—II of FIG. 1.

FIG. 3 is a view taken along the line III—III of FIG. 2.

FIG. 4 is a sectional view taken along the line IV—IV of FIG. 2.

DESCRIPTION OF THE PREFERRED EMBODIMENT

Figure 5:
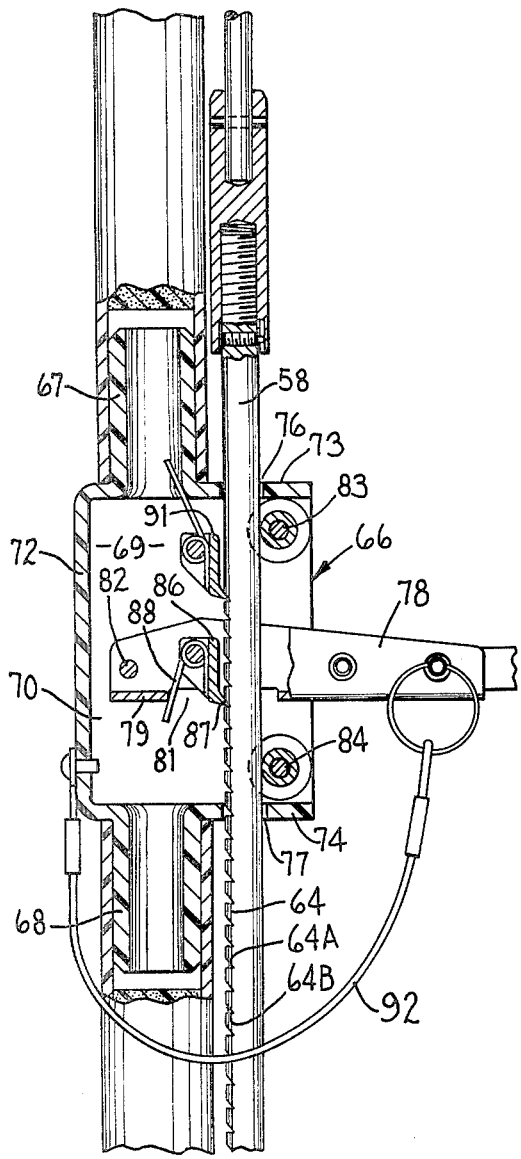
FIG. 5 is a sectional view taken along the line V—V of FIG. 2.

Referring to FIG. 1, the cutting tool 10 according to the invention comprises an elongated pole 11 having a cutter head 12 mounted on one end thereof, linkage 13 for operating the cutting blade of the cutter head, a guide and connector structure 14 reciprocable on the pole for actuating the linkage, an operating rod 16 for effecting reciprocation of the guide and connector structure, a ratchet mechanism 17 for moving the operating rod and a manually operable handle 18 for operating the ratchet mechanism.

The pole 11 is preferably an elongated hollow tube made of lightweight insulating material, such as fiberglass bonded by polyester resin in accordance with conventional practice. The pole is built in two sections 11A and 11B and the ratchet mechanism 17 is interposed between and is fixedly connected to the adjacent ends of the two pole sections so that the pole sections and the ratchet mechanism form a unitary assembly. The pole 11 can be of any suitable length and its length is usually in the range of about 5 to 10 feet. If desired, the interior of the pole 11 can be filled with a lightweight, electrical insulating, closed-cell foam material, such as polyurethane foam, in order to prevent the formation of condensation within the pole, whereby to improve the safety thereof. The lower end of the pole 11 is closed by a cap 21.

The cutter head 12 is fixedly secured to the upper end of the pole 11. The cutter head 12 is comprised of a blade adapter 22 secured to the upper end of the pole. A first, stationary, cutter blade 24 is releasably fixedly secured to the adapter 22 by a bolt 23 and said first cutter blade projects upwardly from the upper end of the pole. The first cutter blade 24 is generally hook-shaped in side elevational view to define a concavity which opens toward one side of the pole 11, here, toward the left side of the pole as appearing in FIG. 1. A second, movable, cutter blade 25 is pivotally mounted on the first cutter blade by means of a bolt and nut connection 26. The second cutter blade 25 also is hook-shaped in side elevational view and its concavity 27 opens in the opposite direction relative to the concavity in the first cutter blade 24. The first and second cutter blades 24 and 25 are disposed in side-by-side relation with their opposing surfaces being parallel to each other and in sliding contact therewith. The opposing edges of the cavity 27 and the corresponding cavity in the first cutter blade 24 are ground to form cutting edges. Thus, the blades 24 and 25 define scissors-like shears in which the cutting edges are formed in oppositely facing concavities so that a conductor of substantially circular cross-section can be received therebetween and cut thereby. When the second cutter blade 25 is pivoted counterclockwise from the position shown in FIG. 1, a cable to be cut can be placed between the oppositely opening concavities in the two cutter blades. In the cutting operation the second cutter blade 25 is pivoted clockwise relative to the first cutter blade 24 into the position shown in FIG. 1 and in so moving the second cutter blade, the cable is cut by the manually cooperating cutting edges. The cutter blades 24 and 25 are of conventional commercially available construction and the invention does not pertain to any discovery relating to the structure of the cutter blades, per se. The cutter blades 24 and 25 are provided with sidewardly extending, mutually abuttable projections defining a stop 28 in order to prevent further clockwise rotation of the second cutter blade 25 when the cutter blades are in the FIG. 1 position.

The second cutter blade 25 has a leg 29 extending downwardly therefrom at a small angle relative to the longitudinal axis of the pole and said leg terminates at a position located a small distance below the upper end of the pole and located sidewardly from the pole. A cutter actuating rod 31 has a clevis 32 secured to the upper end thereof. The clevis 32 straddles the lower end of the leg 29 and said clevis is pivotally secured to said leg by a bolt 33. The actuating rod extends downwardly from the leg 29 and is inclined toward the pole 11.

Figure 6:
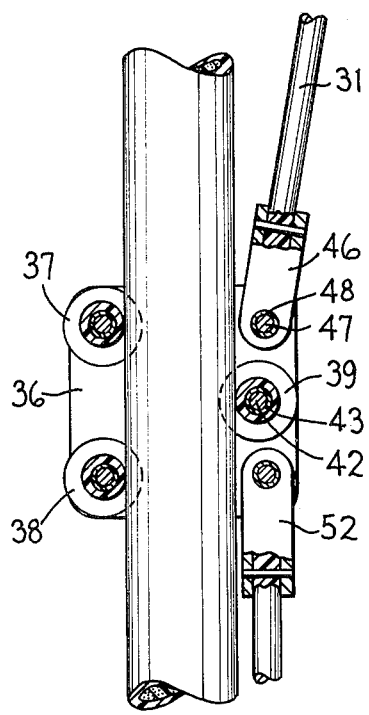
FIG. 6 is a sectional view taken along the line VI—VI of FIG. 3.

Referring to FIGS. 1, 3 and 6, the guide and connector structure 14 is comprised of a pair of flat, parallel, generally rectangular plates 34 and 36 which are disposed on opposite sides of the pole 11 and which are conjointly movable upwardly and downwardly on the pole whereby to move the cutter actuating rod 31 upwardly and downwardly, thereby to pivot the movable cutter blade 25 relative to the fixed cutter blade 24. A pair of vertically spaced rollers 37 and 38 are positioned between the plates 34 and 36 and are located on one side of the pole 11 and in rolling contact therewith. A third roller 39 is positioned on the opposite side of the pole, in rolling contact therewith, approximately midway between the vertical positions of the rollers 37 and 38. The rollers 37, 38 and 39 thereby support the guide and connector structure 14 for vertical reciprocation on the pole. The rollers 37, 38 and 39 preferably are identical and each has an axial concavity 41 corresponding to the circumferential curvature of the portions of the pole that they respectively contact. The rollers 37, 38 and 39 are rotatably supported on bolts 42, by means of bushings 43, so that the rollers are freely rotatable and the bolts function as axles for the rollers. The bolts 42 extend through the plates 34 and 36 and they are fixedly connected thereto by nuts 44 whereby to maintain the plates 34 and 36, and the rollers 37, 38 and 39, in assembled condition to form the guide and connector structure.

A clevis end 46 is secured to the lower end of the actuating rod 31. The clevis end 46 is pivotally mounted on a bolt 47 by means of a bushing 48. Annular spacers 49 are sleeved on the bolt 47 to hold the clevis end 46 against axial movement on the bolt. A nut 51 secures the bolt 47 to the plates 34 and 36. Another clevis end 52 is secured to the upper end of the operating rod 16. The clevis end 52 is pivotally attached to the guide and connecting structure in the same way as the clevis end 46 described above. Thus, the cutter actuating rod 31 and the operating rod 16 both are pivotally connected to the guide and connector structure 14. It will be noted that during normal operation of the cutting tool 10, the angular inclination of the cutter actuating rod 31 relative to the pole 11 will change in order to effect the opening and closing movement of the cutter blades. The cutter actuating rod 31 and the operating rod 16 are made of electrical insulating material such as fiberglass bonded by polyester resin.

Referring to FIGS. 1, 2, 4 and 5, the operating rod 16 extends downwardly from the guide and connector structure 14 substantially parallel with the pole 11. The lower end of the operating rod 16 is secured to adapter 53 by means of a pin 54 and epoxy adhesive. The adapter 53 has a central, elongated, screw-threaded recess 56 opening through the lower end thereof. The screw-threaded upper end portion 57 of a ratchet rod 58 is threaded into the recess 56. A screw 59 extends transversely through the ratchet rod 58 immediately below the upper end portion 57 thereof. A spring-urged plunger 61 projects from one end of the screw 59 into a vertically extending groove 62 formed in a circular cavity 60 in the lower end of the adapter 53. The spring-urged plunger 61 functions as a detent to normally maintain the parts in the position shown in FIG. 4 and to prevent accidental rotation of the ratchet rod 58 relative to the adapter 53. But the spring-urged plunger 61 will permit intentional rotation of the ratchet rod 58 relative to the adapter 53 when such rotation is needed, such as when the ratchet rod 58 is rotated out of engagement with the ratchet mechanism as described hereinbelow.

The ratchet rod 58 extends parallel with the pole 11 to a location close to the lower end thereof. A handle 63 projects sidewardly from the ratchet rod 58 adjacent the lower end thereof so that the ratchet rod can be rotated when that action is needed as described below. The ratchet rod 58 has a row of aligned teeth 64 formed on a portion of the circumference thereof. The teeth 64 define a straight toothed rack. The teeth 64 have a buttress shape, that is, an end wall 64A which extends substantially perpendicular to the longitudinal axis of the ratchet rod and an outwardly and upwardly inclined flank 64B.

A ratchet housing 66 is mounted on the pole between the two sections 11A and 11B thereof. The ratchet housing 66 is made of aluminum. The ratchet housing 66 is fixedly attached to the pole sections 11A and 11B by means of the tubular projections 67 and 68 which are sleeved within the pole sections and are secured thereto by means of an epoxy adhesive or the like. the ratchet housing 66 is generally rectangular in side elevational view, and it has a hollow vertically elongated rectangular internal cavity 70 and that cavity is open along one side thereof. The ratchet housing 66 is comprised of a pair of parallel upright side walls 69 and 71, an end wall 72 and top and bottom walls 73 and 74. The ratchet rod 58 extends vertically through an opening 76 in the top wall 73 and an opening 77 in the bottom wall 74. The openings 76 and 77 are vertically aligned. The ratchet rod 58 is vertically slidable and also is rotatable in the openings 76 and 77.

The ratchet handle 18 has a bracket 78 secured thereto. The bracket 78 is generally U-shaped or channel-shaped in cross-section, as shown in FIG. 2, and it extends laterally into the cavity 70 in the ratchet housing 66 through the open side thereof. The base wall 79 of the bracket has a laterally elongated opening 81 therethrough. The ratchet rod 58 extends vertically through the opening 81. Because the opening 81 is laterally elongated, the bracket 78 can be pivoted upwardly and downwardly without interference with the ratchet rod 58. The inner end of the bracket 78 is supported for pivotal movement in an upward and downward direction on the ratchet housing 66 by means of the pivot pin 82. A pair of vertically spaced guide rollers 83 and 84 are rotatably mounted on the ratchet housing 66 within the internal cavity 70 thereof and adjacent to the open side of said cavity. The rollers 83 and 84 have axial concavities which rollingly engage portions of the periphery of the ratchet rod 58 whereby to guide vertical movement of said ratchet rod.

A driving pawl 86 is pivotally mounted on the bracket 78 between the upright side walls thereof, and said pawl extends through the opening 81 in the bottom wall of the bracket 78. The driving tooth 87 of the pawl 86 is resiliently urged against the ratchet rod 58 by means of the torsion spring 88. The driving tooth 87 of the pawl and the ratchet teeth 64 of the ratchet rod 58 are similarly shaped so that downward or clockwise movement of the handle 18 and bracket 78 relative to the ratchet housing is effective to drive the ratchet rod 58 downwardly. On reverse pivotal movement of the handle 18 and bracket 78, the driving pawl tooth 87 rides up on the upwardly inclined flank of one or more of the teeth 64 and thence into engagement with the transverse end wall of a higher tooth 64 on the ratchet rod. Thus, downward pivotal movement of the handle is communicated to cause downward vertical movement of the ratchet rod 58. This is a one-way drive connection and no movement of the ratchet rod occurs during the reverse upward pivotal movement of the handle 18.

A spring-urged stop pawl 91 is mounted on the ratchet housing 66 for engagement with the teeth 64 to prevent upward movement of the ratchet rod 58 when the handle 18 is pivoted upwardly. However, the spring-urged stop pawl 91 does not interfere with downward movement of the ratchet rod 58 when the handle 18 is pivoted downwardly.

A safety cable 92 is connected between the ratchet housing 66 and the handle 18.

OPERATION

The operation of the cutter apparatus 10, according to the invention, is believed to be apparent from the foregoing description but the same will be briefly reviewed in order to ensure a clear understanding thereof.

Beginning with the parts in the position shown in FIG. 1, in order to effect a cutting operation, first the ratchet rod 58 will be rotated through an arc of about 90° or so relative to the ratchet housing 66, by manipulation of the handle 63, whereby to move the ratchet rod teeth 64 out of engagement with the pawls 86 and 91. When the ratchet rod 58 is rotated as above-described, the spring-urged plunger 61 will be overcome so that the upper end of the ratchet rod will rotate relative to the adapter 53 through the same arc, but the ratchet rod and the adapter will remain connected with one another. When the ratchet 58 has been rotated so that its teeth 64 are not in engagement with the pawls 86 and 91, the ratchet rod 58 can then be pushed vertically upwardly on the pole which causes a corresponding vertical movement of the operating rod 16 and the guide and connector structure 14. Thereby, the cutter actuating rod 31 is moved upwardly and its upper end is simultaneously pivoted outwardly whereby to cause the movable cutter blade 25 to the pivoted counterclockwise from the position shown in FIG. 1 whereby the cavity 27 thereof is positioned to face more or less upwardly to make it possible to receive therein the cable to be cut. Thus, the cable to be cut is placed between the cutting blades 24 and 25. Before or after placing the cable to be cut between the blades 24 and 25, the ratchet rod 58 is rotated back to its original position wherein the ratchet teeth 64 thereof are in engagement with the pawls 86 and 91. The ratchet rod 58 is releasably held in this position by means of the spring-urged detent 61. At this time, the ratchet rod 58 is in an elevated position relative to the ratchet mechanism 17 so that the pawl 86 engages a lower one of the ratchet teeth 64 on the ratchet rod 58. In beginning the actual cutting operation the handle 18 is pivoted downwardly whereby to cause the driving pawl 86 to drive the ratchet rod 58 downwardly a distance corresponding to the distance between two adjacent ratchet teeth 64 or a multiple thereof. This causes an incremental downward movement of the ratchet rod 58, the operating rod 16, the guide and connector structure 14 and it also causes downward and inward pivoting of the cutter actuating rod 31 whereby to cause the movable cutter blade 25 to advance toward the stationary cutter blade 24 one step. The handle 18 is then moved upwardly to its original position, and during such movement the pawl 91 will prevent upward movement of the ratchet rod 58 while the pawl 86 will move upwardly relative to the ratchet rod 58 to engage the next tooth to be engaged. Then, another downward pivoting of the handle 18 will effect a further downward incremental movement of the ratchet rod 58 and a corresponding further advancement of the movable cutter blade 25 toward the fixed cutter blade 24. Repeated operation in this fashion will cause the movable cutter blade 25 to move toward the fixed cutter blade 24 so as to effect an incremental cutting of the cable between the cutting edges thereof in a stepwise fashion. When cutting of the cable has been completed, the parts will be in the position shown in FIG. 1.

The invention provides a simple mechanism for providing a power-assisted operation of the cutting blades so that relatively thick cables can be easily cut. Because of the closely guided movement of the parts, which movement is effected solely by mechanical elements, the described structure is relatively inexpensive yet very durable in operation. The movement of all of the parts, except the handle 18, the cutter actuating rod 31 and the movable cutter blade 25, is essentially linear and is closely guided on the pole so that the operation of the parts is convenient and reliable and is effective to provide an augmented cutting force so that relatively large diameter cables can easily be cut. Because the pole 11 and the rods 31 and 16 are made of electrical insulating material, the lineman is protected from any current being carried by the cable.

A particular preferred embodiment of the invention has been described above. However, the invention contemplates such changes or modifications therein as lie within the scope of the appended claims.

The embodiments of the invention in which an exclusive property or privilege is claimed are defined as follows:

1. A manually operable cutting tool, comprising:
   an elongated pole made of electrical insulating material;
   a cutter assembly mounted on the upper end of the pole and an actuating element for actuating said cutter assembly;
   a linkage assembly mounted on said pole for movement lengthwise thereof, said linkage assembly extending lengthwise of said pole from close to the upper end thereof toward the lower end thereof, the upper end of said linkage assembly being connected to said actuating element so that lengthwise movement of said linkage assembly is effective to operate said cutter assembly; and
   a manually operable ratchet mechanism mounted on said pole adjacent the lower end thereof, said ratchet mechanism being connected to said linkage assembly for effecting stepwise lengthwise movement of said linkage assembly relative to said pole, said ratchet mechanism comprising a ratchet housing fixedly mounted on said pole close to the lower end thereof, said ratchet housing having an internal compartment which is open along one side thereof, an elongated ratchet rod having a longitudinal row of ratchet teeth thereon, said ratchet rod being located outside of said pole and extending parallel therewith said ratchet rod extending vertically through said internal compartment of said housing and being supported for pivotal movement about its lengthwise axis relative to said housing, roller means in said compartment for supporting said ratchet rod for lengthwise movement, a bracket mounted in said housing for pivotal movement about an axis which is perpendicular to the lengthwise axis of said ratchet rod, a one-way drive pawl pivotally mounted on said bracket and spring-urged toward said ratchet rod for engagement with the teeth thereof so that pivotal movement of said bracket in one direction causes said drive pawl to move said ratchet rod in one direction longitudinally of said pole, a spring-urged stop pawl pivotally mounted on said ratchet housing and engageable with the teeth of said ratchet rod to prevent movement of said ratchet rod in the reverse direction, a manually operable handle attached to said bracket and extending sidewardly from said pole for effecting pivotal movement of said bracket, said ratchet rod being pivotable relative to said housing to move the teeth thereof out of engagement with said pawls whereupon said ratchet rod can be slid longitudinally of said pole in said reverse direction.

2. A manually operable cutting tool according to claim 1, in which said ratchet housing has an upper wall, a lower wall, a pair of parallel, substantially rectangular end walls extending between said upper and lower walls and a side wall extending transversely between said end walls at one end thereof and closing one side of said housing, the other side of said housing being open, a post extending upwardly from said upper wall and a post extending downwardly from said lower wall, said pole being divided into upper and lower sections with said upper wall post being sleeved in the lower end of the upper pole section and being secured therein and said lower wall post being sleeved in the upper end of the lower pole section and being secured therein whereby said ratchet housing and said pole sections form an integral assembly, portions of said upper wall, lower wall and end walls of said ratchet housing extending sidewardly of said pole, said portions of said upper and lower walls having vertically aligned openings therethrough through which said ratchet rod extends, said roller means being a pair of vertically spaced rollers located between said end walls and laterally outwardly from said openings for rollingly engaging said ratchet rod, said bracket being a channel-shaped member having a laterally elongated opening in its base wall and vertically aligned with said openings, said ratchet rod extending vertically through said laterally elongated opening in said base wall of said channel-shaped member, said drive pawl being pivotally mounted on the side walls of said channel-shaped member laterally inwardly from said ratchet rod and projecting downwardly through said laterally elongated opening in the base wall of said channel-shaped member, the laterally inner end of said bracket being pivotally mounted on said end walls of said ratchet housing, said stop pawl being pivotally mounted on said end walls of said ratchet housing and located directly above said drive pawl.

3. A manually operable cutting tool according to claim 1, including an adapter secured to the upper end of said ratchet rod so that said ratchet rod can rotate about its lengthwise axis relative to said adapter, said adapter being connected to the lower end of said linkage assembly, and a spring-urged detent for yieldably restraining said ratchet rod against rotation relative to said adapter.

4. A manually operable cutting tool according to claim 1, in which said linkage assembly comprises an operating rod whose lower end is connected to said ratchet rod and which extends upwardly therefrom parallel to said pole, a guide and connector structure vertically movably mounted on said pole, the upper end of said operating rod being connected to said guide and connector structure, a cutter actuating rod whose lower end is connected to said guide and connector structure and extends upwardly therefrom, the upper end of said cutter actuating rod being connected to said cutter actuating element.

5. A manually operable cutting tool according to claim 1 or 2 in which said linkage assembly comprises an operating rod whose lower end is connected to said ratchet, rod and which extends upwardly therefrom parallel to said pole, a guide and connector structure longitudinally movably mounted on said pole toward the upper end thereof, said guide and connector structure comprising a pair of plates located on opposite sides of said pole, a plurality of rollers extending between said plates and rollingly engaging the surface of said pole on opposite sides thereof, means pivotally connecting the upper end of said operating rod to said guide and connector structure at a location thereon which is laterally spaced from said pole and adjacent the lower end thereof, a cutter actuating rod whose lower end is pivotally secured to said guide and connector structure at a location directly vertically above the upper end of said operating rod, said cutter actuating rod extending upwardly from said guide and connector structure and being included at a small angle to the lengthwise extent of said pole, the upper end of said cutter actuating rod being pivotally connected to said cutter actuating element.

6. A manually operable cutting tool according to claim 5, in which said cutter assembly comprises a pair of parallel blades one of which is fixed to the upper end of the pole and the other of which is pivotally connected to said one blade, said blades having facing concavities having cutting edges so that pivotal movement of said blades towards each other causes said cutting edges to cut an object located therebetween, said cutting actuating element comprising a leg integral with said other blade and extending downwardly therefrom at a small angle to the lengthwise extent of said pole.

7. A manually operable cutting tool, comprising:
an elongated pole made of electrical insulating material;
a cutter assembly mounted on the upper end of the pole and an actuating element for actuating said cutter assembly;
a linkage assembly mounted on said pole for movement lengthwise thereof, said linkage assembly comprising an operating rod which extends upwardly from adjacent the lower end of said pole parallel with said pole, a guide and connector structure vertically movably mounted on said pole, the upper end of said operating rod being connected to said guide and connector structure, a cutter actuating rod whose lower end is connected to said guide and connector structure and extends upwardly therefrom, the upper end of said cutter actuating rod being connected to said cutter actuating element to operate said cutter assembly; and
a manually operable ratchet mechanism mounted on said pole adjacent the lower end thereof, said ratchet mechanism comprising an elongated ratchet rod having a longitudinal row of ratchet teeth thereon, a one-way driving pawl for engaging said teeth, means mounting said driving pawl for movement with respect to said pole to cause said ratchet rod to be moved by said driving pawl lengthwise of said pole, and a manually operable handle for moving said driving pawl relative to said pole, said ratchet rod being connected to the lower end of said operating rod for effecting stepwise lengthwise movement of said linkage assembly relative to said pole.

8. A manually operable cutting tool, comprising:
an elongated pole made of electrical insulating material;
a cutter assembly mounted on the upper end of the pole and actuating means for actuating said cutter assembly;
a linkage assembly comprising a guide and connector structure mounted on the exterior of said pole for lengthwise vertical movement therealong, cutter actuator linkage means extending upwardly from said guide and connector structure and connected to said actuating means so that vertical movement of said guide and connector structure along said pole is effective to actuate said cutter assembly, and elongated operating linkage means extending downwardly from said guide and connector structure, said operating linkage means being located on the exterior of said pole and extending substantially parallel therewith; and
manually operable ratchet mechanism mounted on said pole adjacent the lower end thereof, said manually operable ratchet mechanism comprising a ratchet having ratchet teeth thereon, a one-way driving pawl for engaging said ratchet teeth, means mounting said driving pawl for movement with respect to said pole to cause said ratchet to be moved stepwise by said driving pawl with respect to said pole, a manually operable handle for moving said driving pawl relative to said pole, said ratchet being connected to said operating linkage means for effecting stepwise lengthwise vertical movement of said operating linkage means and thereby corresponding stepwise lengthwise vertical movement of said guide and connector structure relative to said pole in response to movement of said ratchet relative to said pole whereby to actuate said cutter assembly.

9. A manually operable cutting tool as claimed in claim 8 wherein said cutter actuator linkage comprises a rigid actuating rod pivotally connected to said guide and connector structure and also pivotally connected to said actuating means, and said operating linkage means comprises a rigid operating rod extending upwardly from said manually operable ratchet mechanism to said guide and connector structure.

* * * * *

UNITED STATES PATENT OFFICE
CERTIFICATE OF CORRECTION

Patent No. 4,254,549           Dated March 10, 1981

Inventor(s)   Earl W. McMullin

It is certified that error appears in the above-identified patent and that said Letters Patent are hereby corrected as shown below:

Column 7, line 37; after "therewith" insert a comma (,).

Column 8, line 54; after "ratchet" delete the comma (,).

Column 9, line 2; change "included" to ---inclined---.

Column 10, line 41; after "linkage" insert ---means---.

Signed and Sealed this

Twenty-sixth Day of May 1981

[SEAL]

Attest:

RENE D. TEGTMEYER

Attesting Officer          Acting Commissioner of Patents and Trademarks